(12) United States Patent
Otake et al.

(10) Patent No.: US 7,142,242 B2
(45) Date of Patent: Nov. 28, 2006

(54) PRISMATIC IMAGE FORMING OPTICAL DEVICE ADAPTED FOR MINIATURIZATION

(75) Inventors: Yoshichi Otake, Kanagawa-ken (JP); Hideki Tengeiji, Kanagawa-ken (JP)

(73) Assignee: Victor Company of Japan, Ltd., Yokohama (JP)

(*) Notice: Subject to any disclaimer, the term of this patent is extended or adjusted under 35 U.S.C. 154(b) by 845 days.

(21) Appl. No.: 10/268,795

(22) Filed: Oct. 11, 2002

(65) Prior Publication Data

US 2003/0076436 A1    Apr. 24, 2003

(30) Foreign Application Priority Data

Oct. 16, 2001  (JP) .............................. 2001-317969
Dec. 14, 2001  (JP) .............................. 2001-381131

(51) Int. Cl.
 H04N 5/225  (2006.01)
 G02B 5/04   (2006.01)

(52) U.S. Cl. ....................................... 348/335; 359/833

(58) Field of Classification Search ................ 348/335, 348/340; 359/731, 730, 729, 728, 727, 726, 359/831, 832, 833, 834, 835, 836, 837; 396/373, 396/382, 384, 386
See application file for complete search history.

(56) References Cited

U.S. PATENT DOCUMENTS 6,266,490 B1 *  7/2001  Mukai et al. ............... 396/384
6,411,783 B1 *  6/2002  Takase et al. .............. 396/382
6,445,887 B1 *  9/2002  Suzuka ....................... 396/373

FOREIGN PATENT DOCUMENTS

| JP | 61-254917 | 11/1986 |
|----|-----------|---------|
| JP | 63-57617  | 4/1988  |
| JP | 07-168096 | 7/1995  |
| JP | 08-029161 | 2/1996  |
| JP | 08-237555 | 9/1996  |
| JP | 09-073005 | 3/1997  |
| JP | 10-322578 | 5/1997  |
| JP | 09133868 A * | 5/1997 |
| JP | 09-211287 | 8/1997  |
| JP | 09-211331 | 8/1997  |
| JP | 10-020196 | 1/1998  |
| JP | 10-122906 | 5/1998  |
| JP | 10-133081 | 5/1998  |
| JP | 11-249018 | 9/1999  |
| JP | 11-337811 | 12/1999 |
| JP | 2000-019406 | 1/2000 |
| JP | 2000-019407 | 1/2000 |

* cited by examiner

Primary Examiner—Vivek Srivastava
Assistant Examiner—Justin Misleh
(74) Attorney, Agent, or Firm—Connolly Bove Lodge & Hutz LLP

(57) ABSTRACT

An image forming optical device to form an image of optical light having prism shaped first and second optical devices. The first optical device has a first interface to pass the optical light into the first optical device, a first reflect interface to reflect the optical light from the first interface and a first output interface to output the optical light from the first reflect interface. The second optical device has a second interface to pass the optical light from the first output interface, a second reflect interface to reflect the optical light from the second interface and a second output interface to output the optical light from the second reflect interface. An optical axis of the optical light passing through the first interface is parallel to an optical axis of the optical light passing though the second output interface.

6 Claims, 4 Drawing Sheets

PRISMATIC IMAGE FORMING OPTICAL DEVICE ADAPTED FOR MINIATURIZATION

BACKGROUND OF THE INVENTION

1. Field of the Invention

The present invention relates to an image forming optical device for forming an optical image of an object on a surface of photoelectric converter in an image sensing element and an image sensing device for incorporating such the image forming optical device and the image sensing element, preferable for use in video camera or digital still camera associated with personal computer (PC) or mobile terminal unit (such as a cellular phone, or a mobile PC), particularly, relates to an image sensing device of which total length can be shortened in comparison with a conventional optical lens system, wherein the image sensing device is equipped with a focus controlling function without extending the total length.

2. Description of the Related Art

An image sensing device is used in video camera or digital still camera for capturing an optical image and converting the optical image into a video signal. Recently, such the image sensing device is also used in a mobile terminal unit (such as a cellular phone, a mobile PC), a videophone system or a video camera for security system.

The image sensing device includes an image forming optical device and a CCD (charge-coupled device). The image forming optical device has a plurality of optical lenses to capture and focus an optical image to pass it to a CCD. The CCD converts the optical image into a video signal to provide the same to various signal processors.

Recently, a mobile terminal unit becomes a multifunctional unit that can transmit not only an audio information but also a visual information such as video pictures and still pictures. As a natural result, a camera portion is utilized for the mobile terminal unit. However, the conventional camera portion is not adequate to be incorporated in the mobile terminal unit because of its size. An optical device in the camera portion can be shortened or miniaturized by reducing a number of lenses but simply reducing the number of lenses may affect the performance of capturing the optical image.

Therefore, there needed an image forming optical device and an image sensing device in a smaller and compact size, preferable in use for a mobile terminal unit, PC, security system and other similar systems.

FIG. 1 is a cross-sectional view of an image forming optical device having a prism lens. In FIG. 1, the image forming optical device is composed of an aperture 1a for limiting the amount of light, a prism lens 1b for passing an optical image to a CCD not shown.

The prism lens 1b is made of high transmittance material such as optical glass or optical plastic. The prism lens 1b has a first interface 1b1 to pass the optical image, and second interface 1b2 and third interface 1b3 to reflect the image inside the prism lens 1b respectively, and a forth interface 1b4 to pass the optical image along the optical axis 100. The length L is a total length of the optical device where the optical image inputs and outputs.

The first and second interfaces 1b1, 1b2 have a concave shape respectively, and the third and forth interfaces 1b3, 1b4 have a convex shape respectively.

The optical image refracts diffusely through the first interface 1b1, and proceeds inside the prism lens 1b, and reflects by the second interface 1b2. The reflected image from the second interface 1b2 then proceeds inside the prism lens 1b and reflects by the third interface 1b3. The optical image reflected from the third interface 1b3 converges at the point out side of the prism lens 1b to form an optical image 1c on the CCD not shown.

The prism lens 1b can inflect the optical path along the optical axis 100 so that the length L can be shortened without losing the performance of the optical device. Consequently, the device can be utilized in a small and compact mobile terminal unit.

However, it is difficult to form the prism lens 1b in a predetermined shape, as it requires precise work on processing the first through forth interfaces of the prism lens 1b.

SUMMARY OF THE INVENTION

Accordingly, in consideration of the above-mentioned problems of the related art, an object of the present invention is to provide an image forming optical device for forming an image of optical light from outside on a predetermined position, including a first optical device (20) of a prism shape having a first interface (2c1, 21) to pass through the optical light, a first reflect interface (2c2, 23) to reflect the optical light from the first interface, and a first output interface (2c3, 25) to output the optical light reflected from the first reflect interface; a second optical device (30) of a prism shape having a second interface (2d1, 31) to pass through the optical light from the first output interface, a second reflect interface (2d2, 33) to reflect the optical light from the second interface, and a second output interface (2d3, 35) to output the optical light reflected from the second reflect interface; wherein, at least two of the six interfaces including the first and second interfaces, the first and second reflect interfaces and the first and second output interfaces are formed in a lens shape having a predetermined curved surface, and an optical axis of the optical light passing through the first interface is parallel to an optical axis of the optical light passing through the second output interface.

The other object of the present invention is to provide an image sensing device for having the image forming optical device as described above.

Other object and further features of the present invention will be apparent from the following detailed description when read in conjunction with the accompanying drawings.

DETAILED DESCRIPTION OF THE PREFERRED EMBODIMENTS

[First Embodiment]

Figure 1:
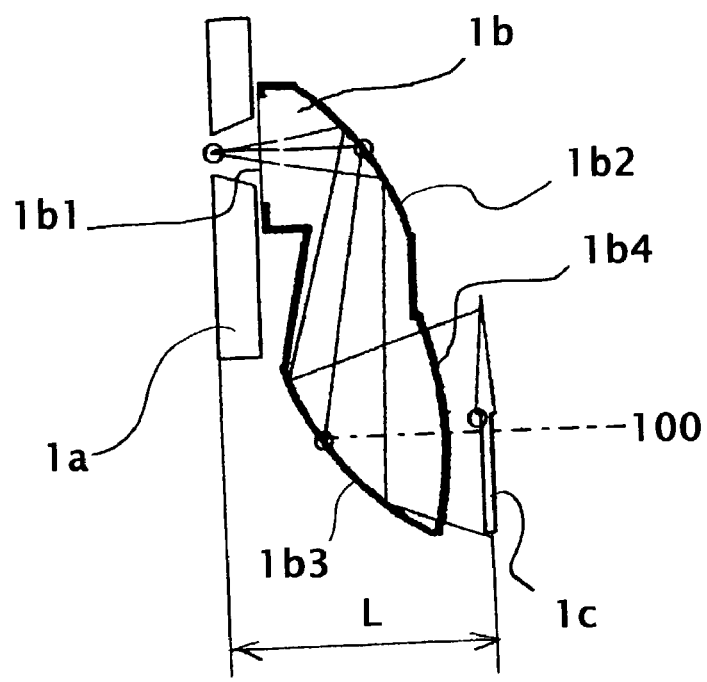
FIG. 1 is a cross-sectional view of an image forming optical device having a prism lens in accordance with the related art.
Figure 2:
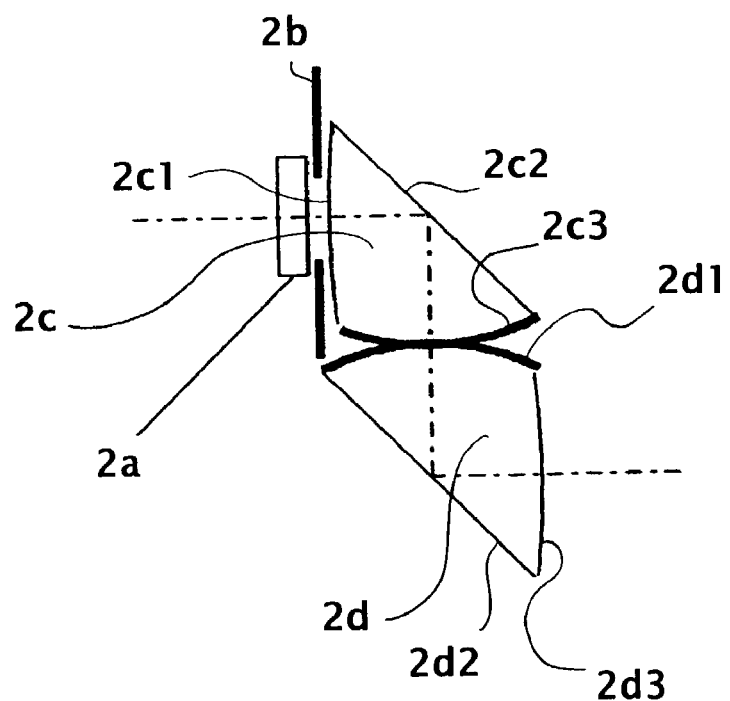
FIG. 2 is a cross-sectional view of an image forming optical device having a prism lens in accordance with a first embodiment of the present invention.

FIG. 2 is a cross sectional view of an image forming optical device in accordance with a first embodiment of the present invention.

In FIG. 2, the image forming optical device is composed of IR (infrared ray) filter for cutting unnecessary infrared rays included in the optical image, a fixed aperture 2b for restricting an amount of light, and separate prism lenses 2c and 2d. The dotted line in FIG. 2 is an optical axis of the optical image going through the image forming optical device as an optical light.

The prism lenses 2c and 2d are made of high transmittance material such as optical glass or optical plastic. The prism lens 2c has a first interface 2c1 which has a convex shape (i.e. lens surface) to pass the optical light, a second interface 2c2 which has plane surface to reflect the optical light, and a third interface 2c3 which has a convex shaped lens surface to pass the optical light.

The prism lens 2d has a forth interface 2d1 which is a convex shaped lens surface to pass the optical light, a fifth interface 2d2 which is plane surface to reflect the optical light, and a sixth interface 2d3 which has a convex shaped lens surface to pass the optical light.

The first interface 2c1 and the forth interface 2d1 are mainly for astigmatism control, and the second interface 2c2 and the third interface 2c3 are mainly for setting a focal length in addition to the astigmatism control.

The image forming optical device described above incorporates two prism lenses 2c and 2d having two interfaces to pass the optical light, and two reflect interfaces to reflect the optical light, and two output interfaces to output the optical light.

The optical light from the object is provided to the first interface 2c1 through the IR filter 2a and the fixed aperture 2b. The optical light refracts and proceeds inside the prism lens 2c, and is reflected by the second interface 2c2. The optical light is refracted and is outputted through the third interface 2c3.

The optical image outputted from the third interface 2c3 goes into the forth interface 2d1. The optical light, then proceeds inside the prism lens 2d and it is reflected by the fifth interface 2d2. The optical light is refracted and is outputted through the sixth interface 2d3. The optical light outputted is forming an optical image on an imaging surface not shown.

Each of the first, third, fourth and sixth interface has a curved surface to form the optical image on the predetermined imaging surface.

As the optical device is incorporated in, for example, a video camera, the optical image obtained by the optical device is provided to the imaging surface of the image sensing element. Then the optical image is converted into video signal and is further provided to signal processing means not shown.

As described above, the image forming optical device has two prism lenses 2c and 2d, and at least two of the six interfaces of the prism lenses 2c and 2d have curved surface. However, the image forming optical device may have more than two curved interfaces. As the fixed aperture 2b is placed contiguous to the first interface 2c1, an eye position can be set in a distant place from the focus point, and the astigmatism and the decrease of light of the object image can be prevented. In addition, the size of the prism lenses can be miniaturized. A diffraction grating can be set on either first to sixth interface to add the functionality of a low-pass filter.

The IR filter 2a can be inserted between the prism lenses 2c and 2d. The prism lenses 2c and 2d can be designed exactly the same with each other which can provide more productivity, stable functionality, and save more manufacturing cost of the component parts.

As described above, at least two interfaces of the prism lenses of the image forming optical device has a curved surface so that the thickness of the optical device can be shorten without losing the optical characteristics. Consequently, the image forming optical device can be miniaturized and designed smaller in size so that the whole image sensing device can be miniaturized which is preferable for the use in a mobile terminal unit.

[Second Embodiment]

Figure 3:
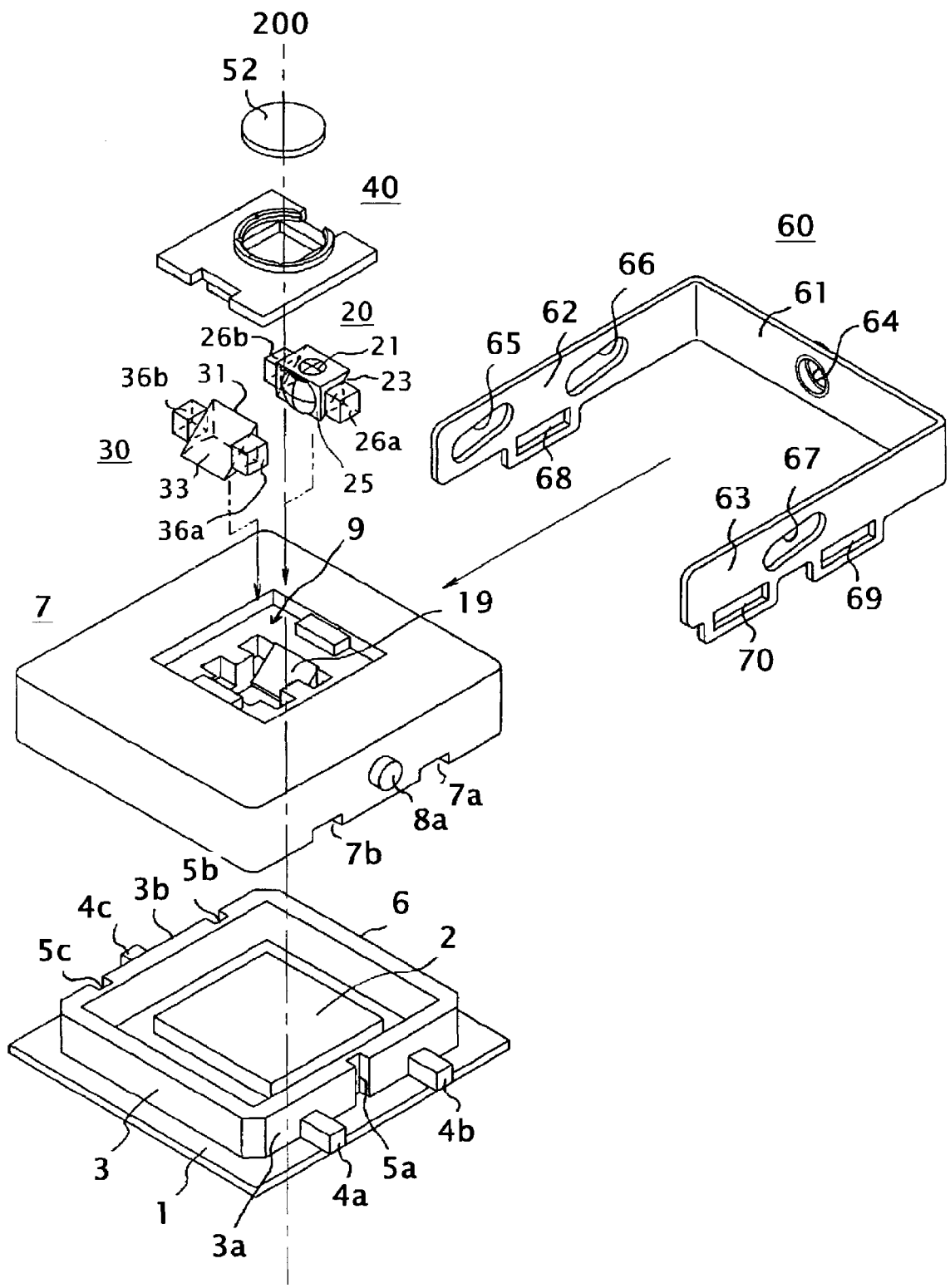
FIG. 3 is a perspective exploded view of an image sensing device in accordance with a second embodiment of the present invention.

FIG. 3 is a perspective exploded view of an image sensing device in accordance with a second embodiment of the present invention.

In FIG. 3, the image sensing device is basically composed of a printed circuit board 1, a base plate 3 to mount a image sensing element 2, a holder 7 having a focus portion for an optical image to be provided to the image sensing element 2, which includes prism lenses 20 and 30, and IR filter 52.

The base 3 has an outer frame 6 with side-walls 3a and 3b, where the side-wall 3a has protrusions 4a and 4b, and the side-wall 3b has protrusion 4c.

The side-wall 3a further has a guide groove 5a between the protrusions 4a and 4b. The side-wall 3b opposed to the side-wall 3a has guide grooves 5b and 5c in both sides of the protrusion 4c. The guide grooves 5a–5c fit with the holder 7 having focus portion as described below. The holder 7 moves back and forth towards the direction of an optical axis 200 to adjust the focus point of the optical image to be provided to the image sensing element 2 through the optical device.

The holder 7 has a depression 9 where the prism lenses 20 and 30 are incorporated. The depression 9 has convex portion to hold the prism lenses 20 and 30 respectively. The holder 7 has a protrusion 8a on one side and another protrusion not shown on the other side to attach with a slide plate 60. The holder 7 also has convex portions 7a, 7b and 7c (7c is not shown) which fit with the protrusions 4a–4c.

The slide plate 60 has main side 61 where one side 62 is connected with the main side 61 at right angles and the other side 63 which is also connected with the main side 61 at right angles.

Figure 5:
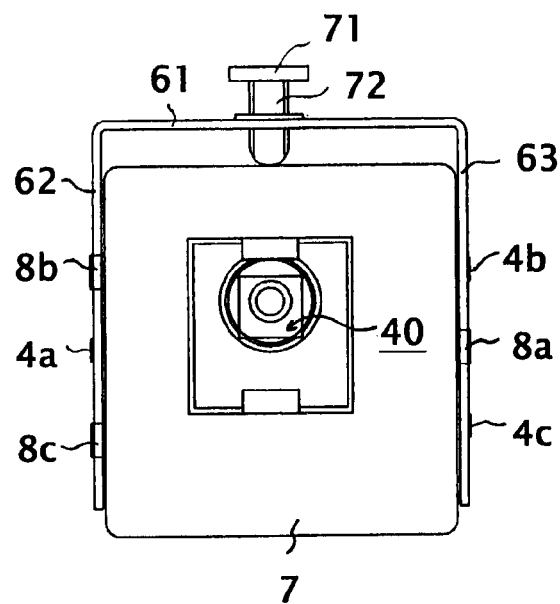
FIG. 5 is a plan view of the image sensing device shown in FIG. 3.

The main side 61 has a screw hole 64 for inserting a screw 72 shown in FIG. 5. The side 62 has a first guide hole 65 and a second guide hole 66, and a hole 68 to be fit with the protrusion 4c. The side 63 has a third guide hole 67 to be fit with the protrusion 8a and holes 69 and 70 to be fit with the protrusion 4a and 4b.

The prism lenses 20 and 30 are put in the depression 9. The depression has a slope 19 to fit with the prism lens 20.

The prism lens 20 has protrusions 26a and 26b and the prism lens 30 also has protrusions 36a and 36b to fit in the depression 9. The protrusions 26a, 26b, 36a and 36b are processed with high degree of accuracy to fit in a predetermined position in the depression 9 so that the prism lenses are in optically precise position.

The prism lens 20 has a first interface 21, a second interface 23 and a third interface 25 to be described below. The prism lens 30 has a fourth interface 31, a fifth interface 33 and a sixth interface to be described below.

After placing the prism lenses 20 and 30, a cover 40 is attached to prominence formed in the depression 9 of the holder 7.

Then an IR filter 52 is inserted in predetermined portion of the cover 40. The image forming optical device and the image sensing element is assembled in one image sensing device. FIG. 5 is a plane view of the image sensing device.

The printed circuit board 1 is attached with the image sensing element 2. The image sensing element 2 with the printed circuit board 1 is placed on the base 3.

The holder 7 is put on the base 3 assembled with the printed circuit board 1 and image sensing element 2. The protrusions 4a–4c fit with the convex portions 7a–7c and the guide groove 5a fits with a guide rail not shown formed on the holder 7. The guide rail and the guide groove 7a fit together to guide the focus movement of the holder 7 towards the direction of the optical axis 200.

The slide plate 60 is attached to the holder 7. The first guide hole 65 and the second guide hole 66 fit with the protrusions not shown formed in the side of the holder 7. The third guide hole 67 fits with the protrusion 8a formed on the holder 7. The holes 69 and 70 formed in the side 63 fit with the protrusions 4a and 4b.

The slide plate 60 is flexible to fit with the protrusions of the base 3 and the holder 7. However, when the prism lenses 20 and 30 are inserted in accurate position in the holder 7, the slide plate 60 is not necessarily moved to adjust the focus of the image sensing element.

Figure 4:
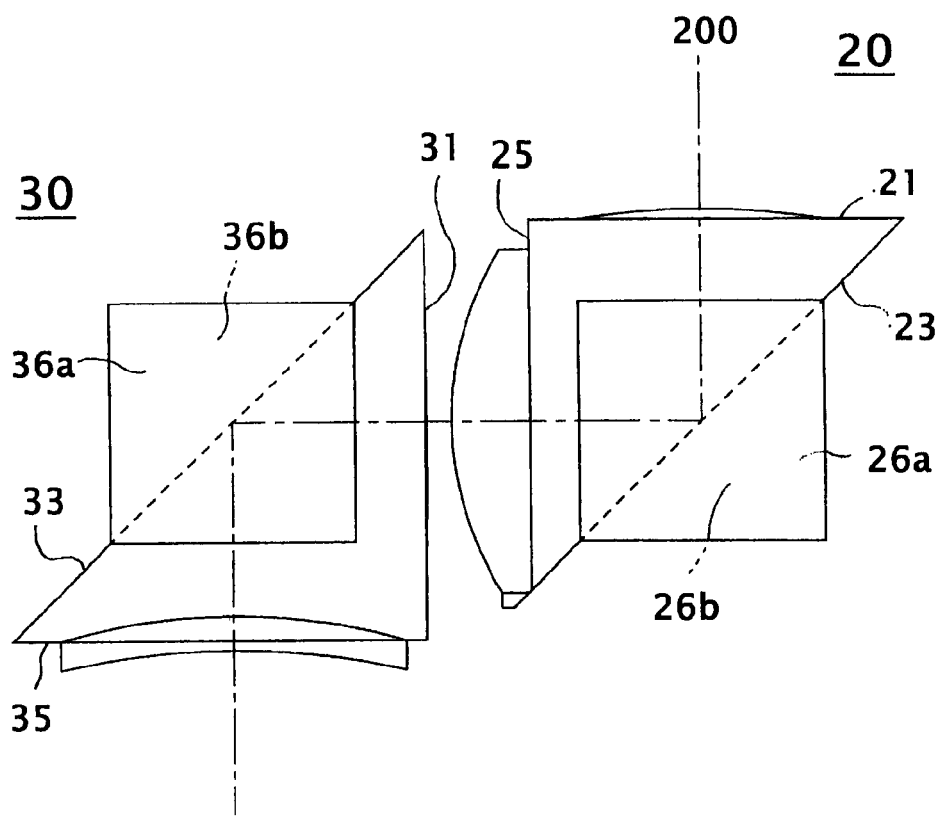
FIG. 4 is a side view of an optical device shown in FIG. 3.

FIG. 4 is a side view of prism lenses 20 and 30 in accordance with the second embodiment of the present invention. The optical light of an object is coming into the image sensing device through the IR filter 52 and unnecessary infrared ray is eliminated from the optical light.

In FIG. 4, the optical light passes through the IR filter 52 and comes along the optical axis 200. The prism lens 20 also has a protrusion 26a and a protrusion 26b on both sides to fit in the predetermined position in the depression 9 formed in the holder 7. The prism lens 30 also has a protrusion 36a and a protrusion 36b on both sides to fit in the predetermined position in the depression 9 formed in the holder 7.

The prism lens 20 has a first interface 21 and a second interface 23 and a third interface 25. The optical light comes into the prism lens 20 through the first interface 21 and then it is reflected by the second interface 23 and passes through the third interface 25.

The prism lens 30 has a fourth interface 31 and a fifth interface 33 and a sixth interface 35. The optical light comes out from the third interface 25 then comes into the prism lens 30 through the fourth interface 31. The object light from the fourth interface 31 is reflected by the fifth interface 33 and passes through the sixth interface 35. The optical light from the sixth interface 35 is provided to the image sensing element 2.

Figure 6:
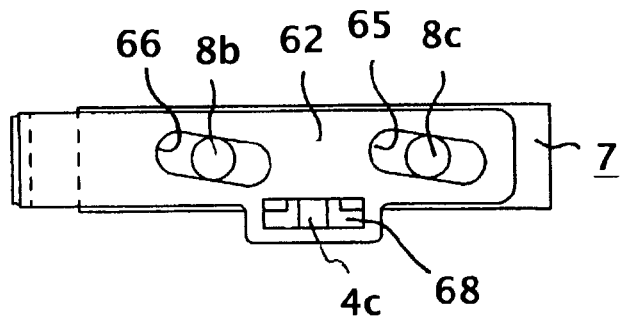
FIG. 6 is a left side view of the image sensing device shown in FIG. 5.
Figure 7:
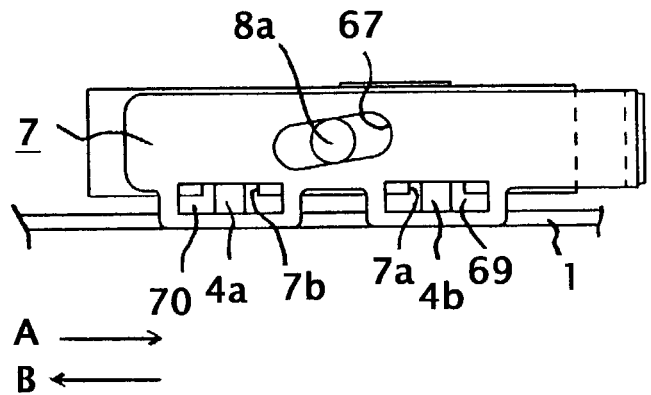
FIG. 7 is a right side view of the image sensing device shown in FIG. 5.
Figure 8:
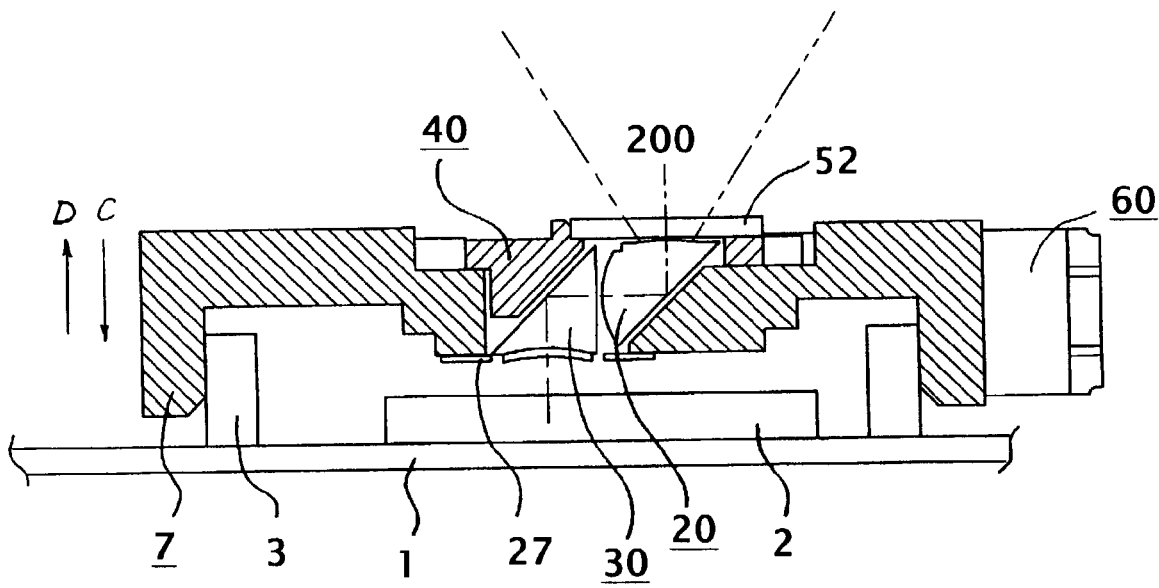
FIG. 8 is a cross sectional view of a substantial part of the image sensing device shown in FIG. 5.

The focus adjustment is conducted as follows. FIG. 5 is a plan view of the image sensing device in accordance with the second embodiment of the present invention. FIG. 6 is a left side view of the image sensing device shown in FIG. 5. FIG. 7 is a right side view of the image sensing device shown in FIG. 5. FIG. 8 is a cross sectional view of a substantial part of the image sensing device shown in FIG. 5.

In FIG. 5, a focus adjust member 71 is inserted through the screw hole 64 formed in the main side 61 of the slide plate 60, and which screw contacts the holder 7. When the focus adjust member 71 is rotated to the counterclockwise direction, the slide plate 60 moves towards the orthogonal direction of the optical axis. Consequently, as shown in FIGS. 6 and 7, the movement of the slide plate 60 leads an interaction between the protrusions 8a–8c fit and the side holes 65–67 that the holder 7 moves towards the direction parallel to the optical axis 200 (i.e., for example, the direction B shown in FIG. 7). Therefore, as shown in FIG. 8, the holder 7 moves to, for example, the direction C and the distance between the image sensing element 2 and the holder 7 changes to adjust the focus point of object image to be projected onto the image sensing element 2.

When the focus adjust member 71 is rotated to the clockwise direction, the holder 7 moves towards the opposite direction as described above (i.e. the direction D shown in FIG. 8).

The focus adjustment can be conducted either manually or automatically. In addition, the focus position can be fixed in wide range focus by utilizing wide-angle lenses and controlling aperture of the optical lens so that the focus adjustment can be omitted.

The object image projected onto the image sensing element 2 is converted into video signal and outputted to the signal processor not shown. The signal processor can be a conventional type, which is well utilized for video camera.

As described above, the image forming optical device can be formed thinner and concise that it can be incorporated in a small information terminal unit such as mobile PC or cellular phone in low cost.

As described above, the image forming optical device can be formed thinner and concise as it can clinch the direction of the optical direction in a simple way.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

What is claimed is:

1. An image forming optical device for forming an image of optical light from outside on a predetermined position, comprising:

a first optical element of a prism shape having a first interface to pass through the optical light, a first reflect interface to reflect the optical light from the first interface, and a first output interface to output the optical light reflected from the first reflect interface;

a second optical element of the same prism shape as the first optical element having a second interface to pass through the optical light from the first output interface, a second reflect interface to reflect the optical light from the second interface, and a second output interface to output the optical light reflected from the second reflect interface outside and to form an image of the optical light on a predetermined position;

wherein, at least two of the six interfaces including the first and second interfaces, the first and second reflect interfaces and the first and second output interfaces are formed in a lens shape having a predetermined curved surface, and wherein an optical axis of the optical light passing through the first optical element and another optical axis of the optical light passing though the second optical element are in one plane, and wherein the optical axis of the optical light passing through the first interface is parallel to the other optical axis of the optical light passing through the second output interface, the first and second optical elements further having a protrusion for positioning a direction of the two optical axes in one plane and a rotative direction of the first and second optical elements respectively, wherein the protrusion is provided on surfaces of the first and second optical elements in parallel with the one plane and away from the optical axes so as to be perpendicular to the first interface and the second interface respectively.

2. The image forming optical device as claimed in claim 1, wherein the first reflect interface reflects the optical light passing through the first interface at 90 degrees and the second reflect interface reflects the optical light passing through the second interface at 90 degrees.

3. An image sensing device including an image forming optical device and an image sensing element for capturing an optical image to obtain a video signal, comprising;

a first optical element of a prism shape having a first interface to pass through the optical light, a first reflect interface to reflect the optical light from the first interface, and a first output interface to output the optical light reflected from the first reflect interface;

a second optical element of the same prism shape as the first optical element having a second interface to pass through the optical light from the first output interface, a second reflect interface to reflect the optical light from the second interface, and a second output interface to output the optical light reflected from the second reflect interface outside and to form an image of the optical light on a predetermined position;

wherein, at least two of the six interfaces including the first and second interfaces, the first and second reflect interfaces and the first and second output interfaces are formed in a lens shape having a predetermined curved surface, and wherein an optical axis of the optical light passing through the first optical element and another optical axis of the optical light passing through the second optical element are in one plane, and wherein the optical axis of the optical light passing through the first interface is parallel to the other optical axis of the optical light passing through the second output interface, the first and second optical elements further having a protrusion for positioning a direction of the two optical axes in one plane and a rotative direction of the first and second optical elements respectively, wherein the protrusion is provided on surfaces of the first and second optical elements in parallel with the one plane and away from the optical axes so as to be perpendicular to the first interface and the second interface respectively, and wherein the image sensing element for converting the optical light outputted from the second output interface into a video signal is disposed at the predetermined position on which an image of the optical light outputted from the second output interface of the second optical element.

4. The image sensing device as claimed in claim 3, wherein the first reflect interface reflects the optical light passing through the first interface at 90 degrees and the second reflect interface reflects the optical light passing through the second interface at 90 degrees.

5. The image sensing device as claimed in claim 3, further comprises moving means for conducting focus adjustment between the second output interface and the image sensing element to be formed with an image of the optical light by moving the first and second optical elements to the optical axis direction of the optical light outputted from the first and second output interfaces.

6. The image sensing device as claimed in claim 3, further comprises an IR filter and an aperture section being disposed in the first interface side of the first optical element.

* * * * *